(12) United States Patent
Burns

(10) Patent No.: US 8,720,490 B1
(45) Date of Patent: May 13, 2014

(54) DEVICE FOR REDUCING DEEP SEA OFF-SHORE OIL PIPE LEAKS AND RELATED METHOD OF USE

(76) Inventor: James Burns, Sugar Loaf Key, FL (US)

(*) Notice: Subject to any disclaimer, the term of this patent is extended or adjusted under 35 U.S.C. 154(b) by 152 days.

(21) Appl. No.: 13/156,386

(22) Filed: Jun. 9, 2011

Related U.S. Application Data

(60) Provisional application No. 61/354,854, filed on Jun. 15, 2010.

(51) Int. Cl.
*F16L 55/18* (2006.01)

(52) U.S. Cl.
USPC .................................. 138/97; 138/93; 138/99

(58) Field of Classification Search
USPC ............................................... 138/93, 97, 99
See application file for complete search history.

(56) References Cited

U.S. PATENT DOCUMENTS

| | | | | |
|---|---|---|---|---|
| 3,618,639 A | * | 11/1971 | Daley et al. | 138/97 |
| 3,762,446 A | * | 10/1973 | Tungseth et al. | 138/97 |
| 3,834,422 A | * | 9/1974 | Larson | 138/97 |
| 4,351,349 A | * | 9/1982 | Minotti | 137/15.15 |
| 5,778,919 A | * | 7/1998 | Petrone | 137/15.08 |
| 5,996,621 A | * | 12/1999 | Hagiwara et al. | 137/565.33 |
| 6,012,477 A | * | 1/2000 | Hagiwara et al. | 137/205 |

* cited by examiner

*Primary Examiner* — Frederick C Nicolas
(74) *Attorney, Agent, or Firm* — Allen, Dyer, Doppelt, Milbrath & Gilchrist, P.A.

(57) ABSTRACT

A tubular assembly to engage a leaking pipe under water includes an insert, a triangular shaped front guide, an outer annular sleeve, and a fluid supply assembly. The insert is hallow, tubular in shape and construction, and includes a first end, second end and an exterior surface containing a plurality of inflatable bladders and flanges. The front guide attaches to the first end of the insert, and includes a retarder tube to collect fluid from the leaking pipe. The outer annular sleeve is sized to surround both the insert and the leaking pipe, and includes retaining bolts capable of engaging the leaking pipe. The fluid supply assembly fills each inflatable bladder and includes a supply line, a distribution tube, a plurality of feed lines that communicates with each inflatable bladder via an injector, and check valves placed between each inflatable bladder and each feed line.

20 Claims, 7 Drawing Sheets

DEVICE FOR REDUCING DEEP SEA OFF-SHORE OIL PIPE LEAKS AND RELATED METHOD OF USE

CROSS-REFERENCE TO RELATED APPLICATIONS

This application claims the benefit of U.S. Provisional Application No. 61/354,854, filed Jun. 15, 2010, entitled "Device for Reducing Deep Sea Off-Shore Oil Pipe Leaks and Related Method of Use" the contents of which are hereby incorporated by reference herein in their entireties all commonly owned.

FIELD OF THE INVENTION

The invention is directed to a flow-thru restraint for reducing oil spills occasioned during deep sea off-shore pipe leaks proximate the ocean floor. The device includes a tubular insert containing a plurality of inflatable bladders to engage the interior of the leaking pipe, in addition to an annular sleeve containing both a funnel guide and a plurality of retaining bolts to contact the exterior of the leaking pipe.

BACKGROUND OF THE INVENTION

Offshore oil and natural gas in the Gulf of Mexico represents a major source of fossil fuels within the United States. The western and central gulf, including offshore areas proximate Texas, Louisiana, Mississippi, and Alabama constitutes one of the richest petroleum producing areas in this country. In fact, statistics show that federal leases to conduct off-shore drilling in the area have resulted in producing over 25 percent of the nation's oil and some 14 percent of the nation's natural gas needs.

With advances in oil drilling and production technologies in recent years, oil companies have extended drilling farther from shore and into deeper waters. Oil drilling from depths greater than 1,000 feet began in 1979. Currently, some 72 percent of oil production in the Gulf of Mexico comes from drilling in waters greater than 1,000 feet deep. Some sixty-five oil discoveries have been made in waters greater than 5,000 feet. In fact, oil has been discovered in waters as deep as 9,875 feet. These deep water drilling activities produce some 400 million barrels of oil each year, with projections that by 2013 oil production for the gulf will near 700 million barrels yearly.

Offshore oil drilling and prospecting in the Gulf of Mexico is conducted by large semi-submersible mobile offshore drilling units (MODUs). MODUs are massive floating dynamically positioned drilling rigs which can operate in waters up to 8,000 feet deep and drill up to 30,000 feet. Most MODUs are owned and operated by large drilling companies and are leased by large petroleum manufacturers and refiners. Such MODUs are capable of moving about the Gulf of Mexico to drill into deep waters to prospect for oil, and then prepare the area for later pumping and recovery of the oil by other off-shore rigs.

One of the glaring issues relating use of MODUs employed to drill in the Gulf of Mexico is the inability to access drilling areas created via the process. As the drilled areas often are located well over a mile below sea level, there is no ability for manned submersibles (let alone divers) to access a drilled site to correct any accident—such as a leaking drill site. Instead, robotic submersibles (and/or lowering of 'top hat' containment housings via barges/tankers positioned above the drill site) must be used to help fix leaking pipes tied to leaking drill sites.

The limits of robotic submersibles and rudimentary containment housings has been realized with the Apr. 20, 2010 Deepwater Horizon MODU explosion and resulting oil spill. As has been well documented by the media, on Apr. 20, 2010, methane gas from a well being created by the Deepwater Horizon shot up and out of the drill column marine riser, ignited and exploded. The result was a fire which engulfed the platform, killing several workers, and ultimately caused the MODU to sink the morning of Apr. 22, 2010. Several days later, it was confirmed that the wellhead, positioned on the ocean floor, was indeed leaking oil into the Gulf of Mexico.

While there exist several devices known to those of ordinary skill in the art to cap and/or seal such leaking wellheads (located deep within the sea floor), the efforts of British Petroleum relating to the Deepwater Horizon disaster have shown the limitations of the current state of the art. For example, the current technology for curing a leaking wellhead has included a containment dome, known as a 'top hat' which is lowered to the sea bed and deployed over the oil leak. Both the weight of the 'top hat' and the dimension would allow oil to be recovered and pumped to tankers above the accident area without risk of further leaking into the Gulf of Mexico. However, when there is a high level of gas and petroleum flow, as exhibited with the Deepwater Horizon disaster, such 'top hat' can have limited if any successful impact on sealing the area.

Accordingly, there is a need for a robust and cost effective device to reduce flow-thru of escaping petroleum (and natural gas) caused by drilling accidents in the deep sea. Such device should allow quick and effective reduction of an oil leak in areas in which manned submersibles (as well as divers) are unable to repair.

SUMMARY OF THE INVENTION

The present invention solves many of the limitations and shortcomings found in the art of reducing flow-thru of escaping petroleum and natural gas caused by drilling accidents in the deep sea. The invention is directed to a tubular assembly of a sufficient dimension to fit about a leaking pipe associated with an oil and/or gas leak. The tubular assembly may include four primary components: (a) a front guide, (b) an inner insert containing a plurality of flanges and inflatable bladders, (c) a fluid supply assembly, and (d) an annular sleeve containing both restraining bolts as well as a funnel guide.

First, the essentially triangular front guide helps position the inner insert into the leaking pipe, as well as to position and protect the retarder tube—which functions to later collect and retrieve the displaced oil and/or gas. Positioned next to the front guide is the inner insert, which should have a diameter less than the interior diameter of the leaking pipe. Such inner insert first includes a plurality of inflatable bladders that are tubular in cross section and capable of quick inflation and deflation. When deflated, the inflatable bladders should allow a large cavity within the inner insert. Inter-dispersed between the inflatable bladders are a plurality of perpendicular flanges which assist in creating a seal (with the bladders inflated to contact the leaking pipe), as well as to protect the inner insert and provide rigidity.

A fluid supply assembly helps fill and evacuate each inflatable bladder. The assembly includes a supply line, distribution tube, a plurality of feed lines which connect to the inflatable bladders, check valves attached to each feed line, injectors, release valves (for deflating each inflatable bladder)

and an evacuation tube. The annular sleeve is essentially tubular, having a diameter greater than the inner insert in order to surround and encase the leaking pipe. The annular sleeve contains a plurality of retaining bolts (which can be spring actuated) to secure the tubular assembly upon the leaking pipe, as well as a funnel guide to direct and secure the annular sleeve about the girth of the leaking pipe.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overall Assembly of the Device

Figure 1:
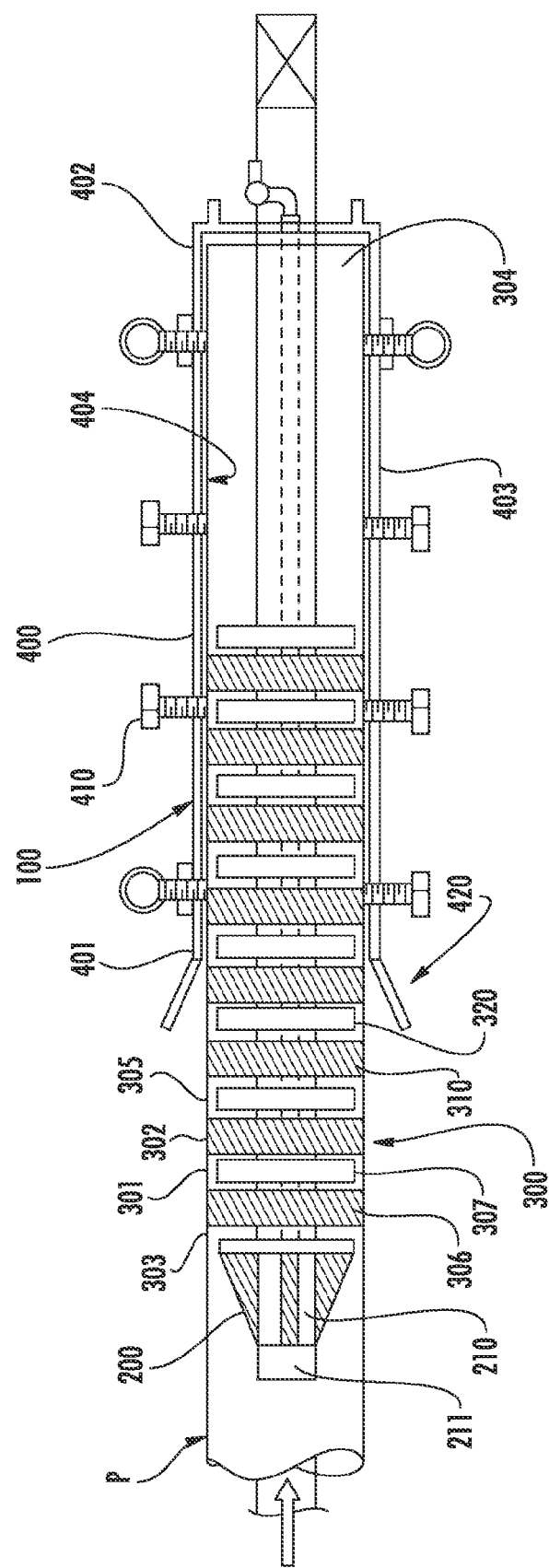
FIG. 1 is a cross section of the one embodiment of the invention including a restraint device showing a tubular insert and outer annular sleeve and funnel guide.
Figure 2:
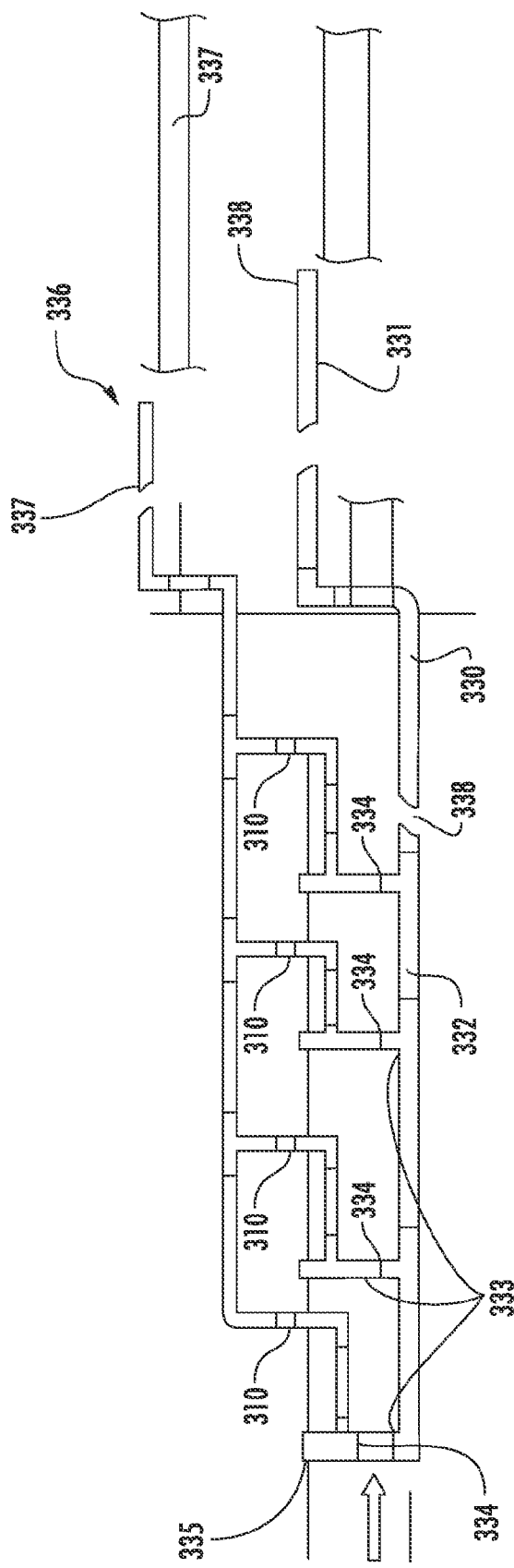
FIG. 2 is a front view of supply lines which fill the various inflatable bladders within the tubular insert illustrated with reference to FIG. 1.
Figure 3:
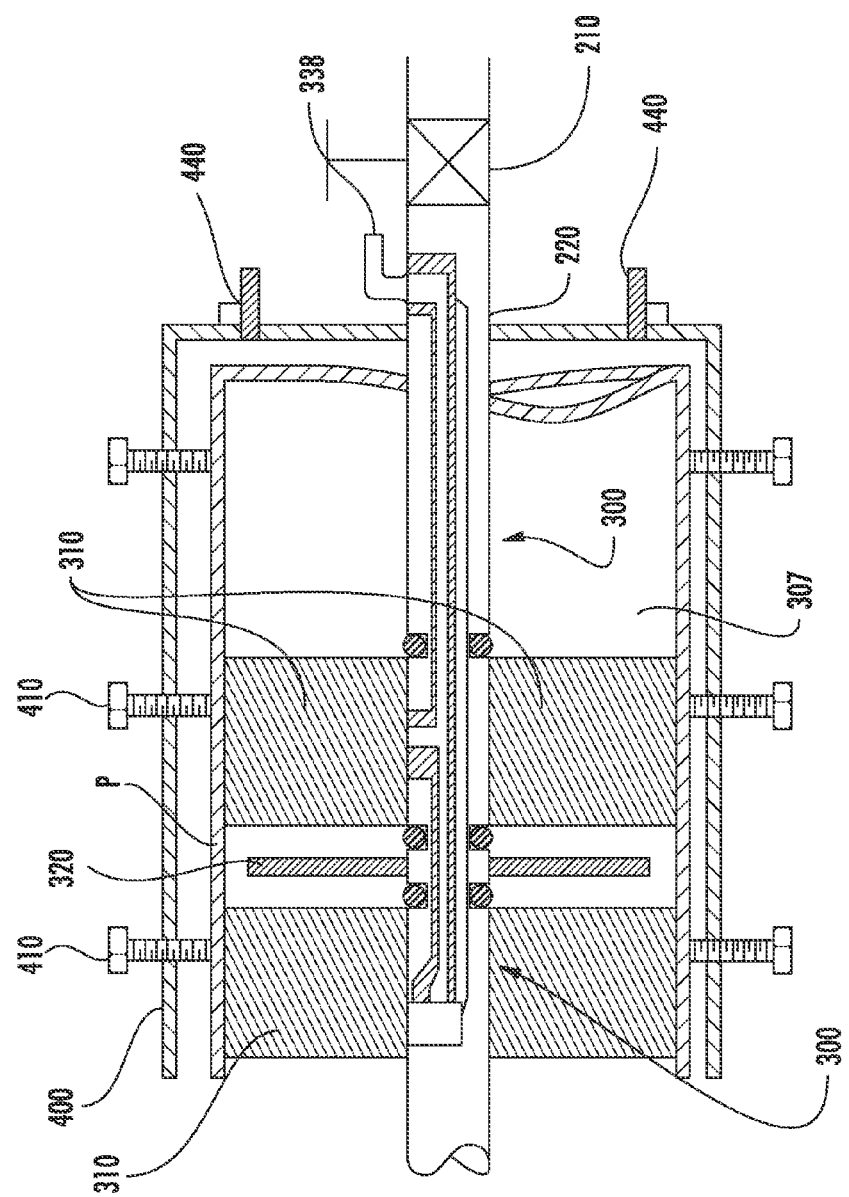
FIG. 3 is a cross sectional view of the annual sleeve illustrated with reference to FIG. 1 including positioning of various retaining bolts.
Figure 4:
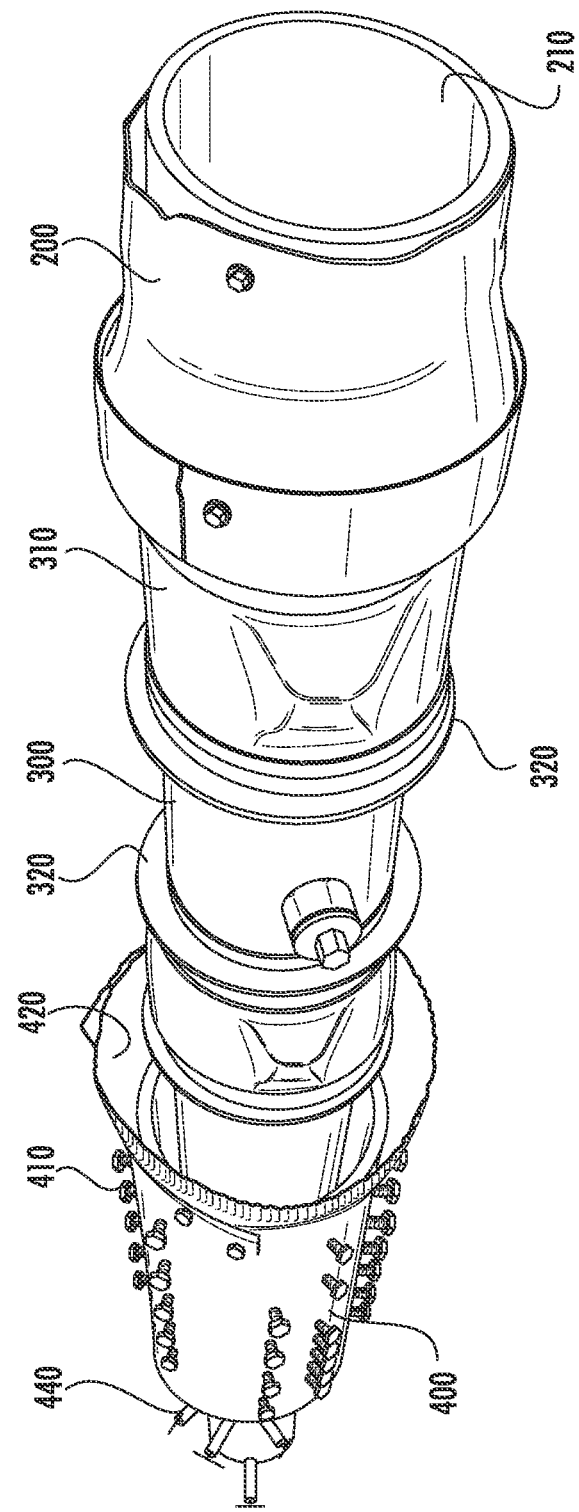
FIG. 4 is a perspective view of the device of FIG. 1 illustrating a plurality of inflatable bladders.
Figure 5:
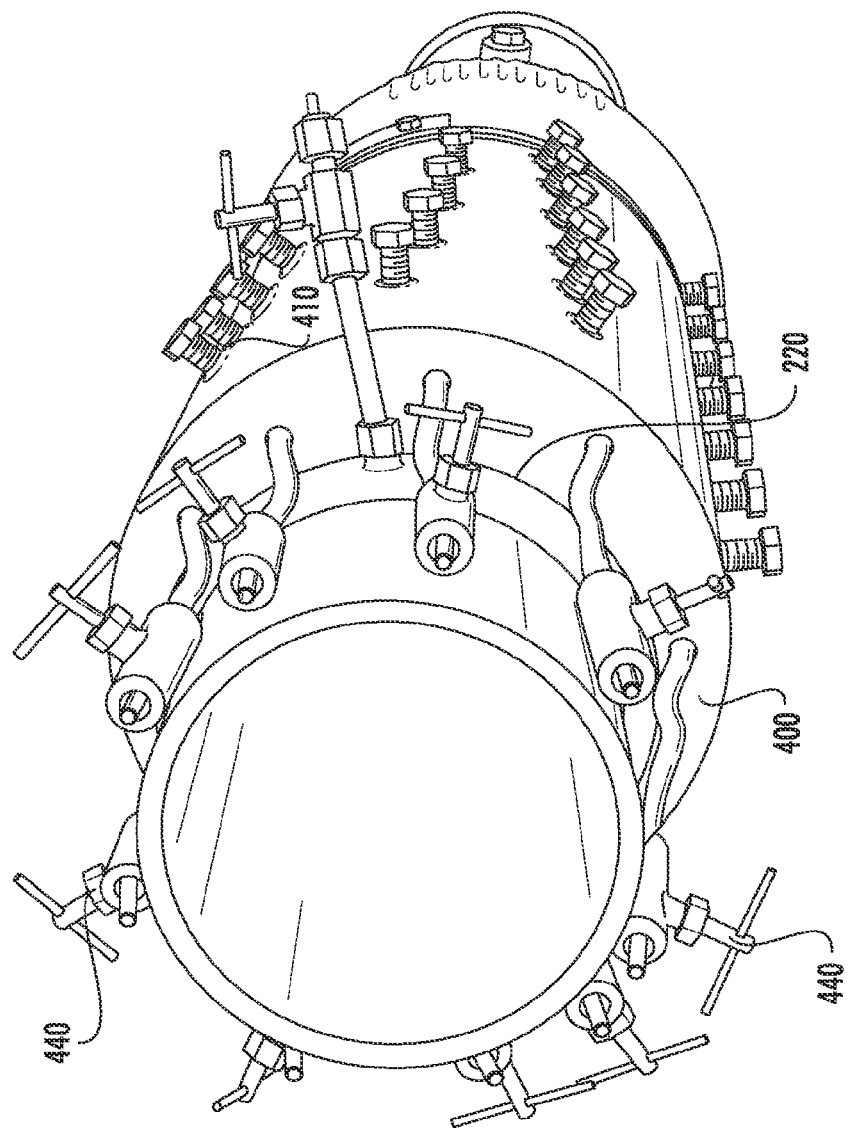
FIG. 5 is a perspective view of pressure relief valves.
Figure 6:
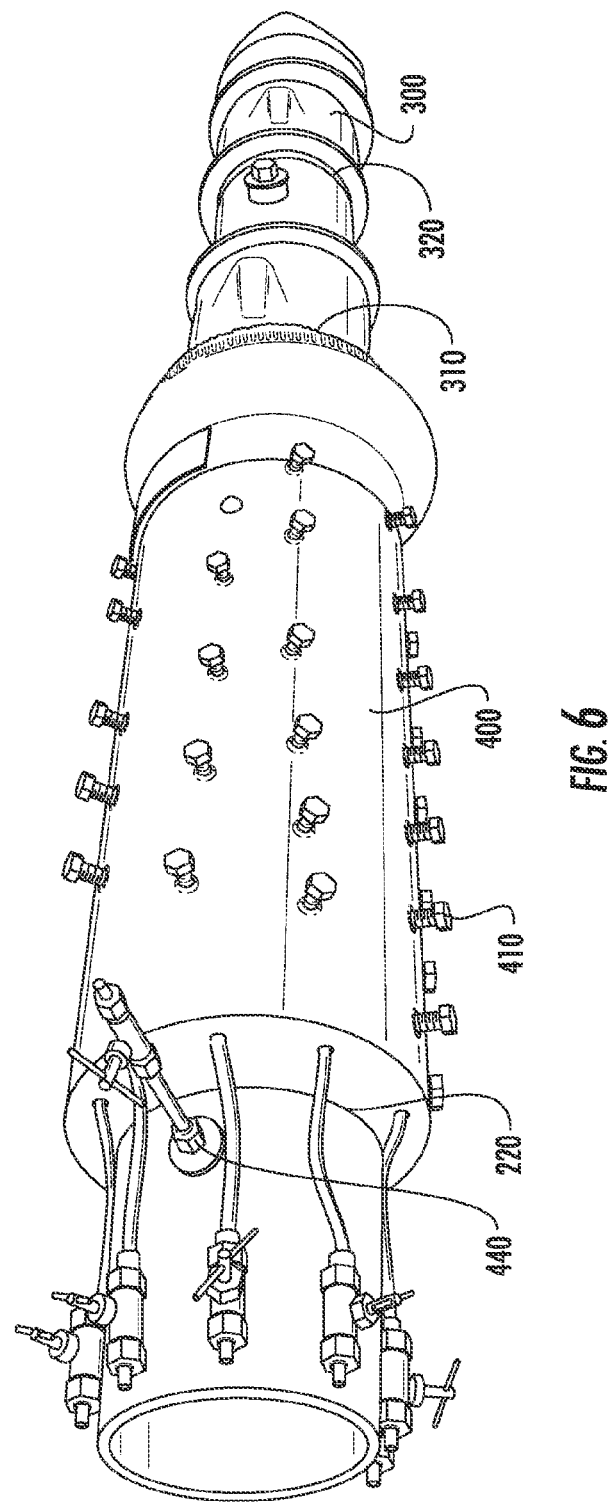
FIG. 6 is a perspective view of the device of FIG. 1 illustrating positioning of various retaining bolts on the annular sleeve.
Figure 7:
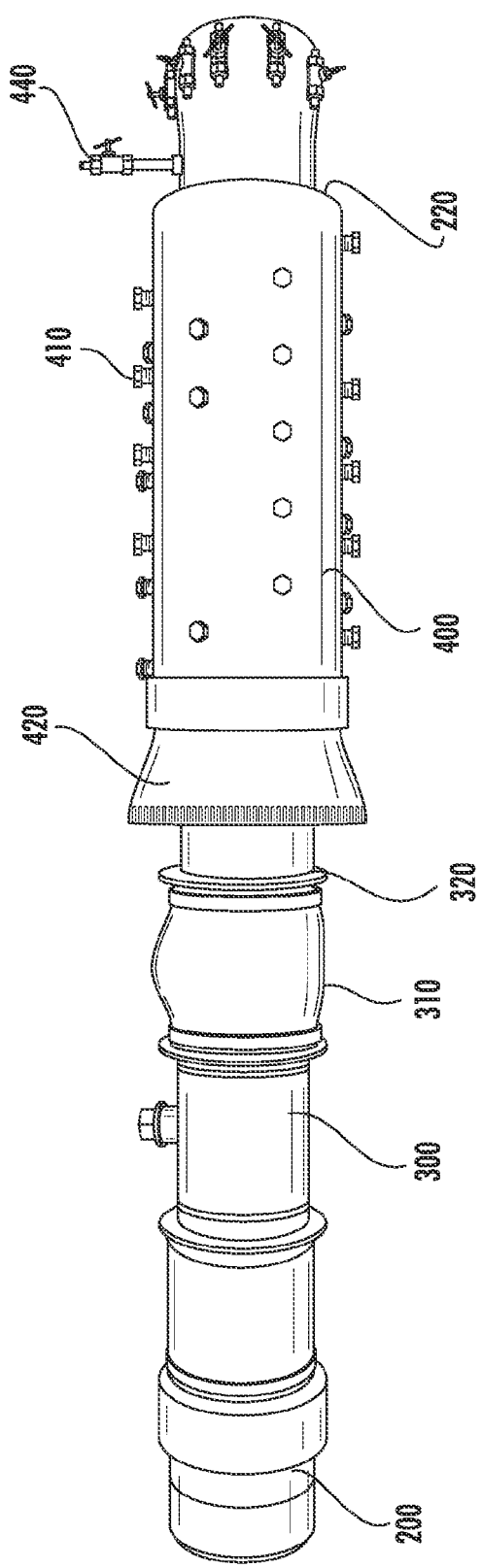
FIG. 7 is a side view of the device of FIG. 1 showing a plurality of pressure relief valves.

As shown in FIG. 1 through FIG. 3, one embodiment of the invention is directed to a restraint device that herein described as a tubular assembly 100 which fits over a leaking pipe. Such tubular assembly 100 should be of a sufficient size and dimension in comparison to the leaking pipe. Moreover, construction of such tubular assembly 100 should ensure proper function in the extreme conditions over 1,000 feet below the sea level—including high pressures, low temperatures and interaction with toxic and highly corrosive chemicals present at the ocean floor proximate an oil and/or gas leak. Accordingly, the majority of the tubular assembly 100 should be manufactured primarily from a strong alloy metal and/or composite.

First turning to FIG. 1, the tubular assembly 100 may include, but is certainly not limited to, a front guide 200, an inner insert 300 containing a plurality of inflatable bladders 310, and an outer annular sleeve 400 having a plurality of retaining bolts 410. The inner insert 300 is essentially tubular in construction and generally rectangular in cross section, having an exterior surface 301 and corresponding interior surface 302. As further illustrated with continued reference to FIG. 1, the inner insert 300 also includes a first end 303, a corresponding second end 304, a top side 305 and a corresponding bottom side 306. Positioned within the interior surface 302 of the inner insert 300 is a cavity 307.

The Front Guide and Retarder Tube

Positioned at the first end 303 of the inner insert 300 is the front guide 200. As shown in FIG. 1, the front guide 200 is essentially triangular in cross section. Positioned within the middle of the front guide 200 is a retarder tube 210. The retarder tube 210 has an opening 211 positioned at a tip of the front guide 200. Such retarder tube 210 functions to collect and retrieve the leaking oil and/or natural gas, once the tubular assembly 100 is positioned in place and inserted about the leaking pipe and/or wellhead. The guide 200 also functions to protect and shield the retarder tube 210 from damage when the tubular assembly 100 is being positioned within the leaking pipe.

The Inflatable Bladders and Flanges

As further shown in FIG. 1, the inner insert 300 contains a plurality of both inflatable bladders 310 and flanges 320 generally perpendicular to the longitudinal axis of the device 100. These perpendicular flanges 320 are inter-dispersed between each inflatable bladder 310. Moreover, such flanges 320 function to protect the overall integrity of the inner insert 300 (and strengthen its construction) as well as increase the effectiveness of the inflatable bladders 310.

Each inflatable bladder 310 is essentially tubular in shape and dimension, and designed to both inflate and deflate quickly. Each inflatable bladder 310 is positioned proximate the exterior surface 301 of the inner insert 300 and positioned parallel to one another. Preferably, each inflatable bladder 310 is constructed of a waterproof, sealed, durable and corrosion-proof material that is capable of expanding and contracting—such as rubber, polymer or similar material known to those of ordinary skill in the art.

When in a deflated state, each inflatable bladder 310 should have minimal internal volume in order to increase the capacity of the cavity 307 within the inner insert 300. Such construction allows for minimal drag on the tubular assembly 100, while the outer annular sleeve 400 is being secured to the leaking pipe (through use of a plurality of retaining bolts 410). However, when in an expanded/inflated state, each inflatable bladder 310 should sufficiently contact (and effectuate a seal) the interior of the leaking pipe.

FIGS. 1 and 3 further illustrate use of a plurality of flanges 320 positioned in parallel relationship to one another. The flanges 320 are inter-dispersed between each inflatable bladder 310. Moreover, one function of the flange 320 is to help guide each inflatable bladder 310 during either expansion or deflation, as well as to help effectuate a greater seal with the interior of the leaking pipe (during expansion).

Each flange 320 is positioned along the exterior surface 301 of the inner insert 300. Moreover, the flanges 320 are affixed essentially perpendicular to the exterior surface 301. Accordingly, the flanges 320 help to provide strength and rigidity to the inner insert 300. In addition, such construction of the various flanges 330 helps protect the internal components of the tubular assembly 100, while it is being inserted into the leaking pipe.

The Fluid Supply Assembly

While FIG. 1 illustrates the various components of the tubular assembly 100 with specific focus on the inner insert 300, FIG. 2 illustrates the fluid supply assembly 330 capable of filling (and evacuating) each inflatable bladder 310. As shown, the fluid supply assembly 330 includes, but is certainly not limited to, a supply line 331, a distribution tube 332, a plurality of feed lines 333, check valves 334 attached to each feed line 333, an injector 335, release valves 336 located proximate an evacuation line 337. One of ordinary skill in the art, through review of the invention and FIG. 2, will recognize similar assemblies and components to effectuate supply of fluid to each inflatable bladder 310.

As further shown in FIG. 2, a fluid 338 (such as water, drilling mud, air, etc.) is fed into the supply line 331. Such supply can occur through tanks or receptacles proximate the tubular assembly 100 positioned near the leaking pipe or fed from the ocean surface via barge, freighter, rig, or R.O.V. (Remote Operating Vehicle). Upon entering the supply line 331, the fluid 338 is then positioned within the distribution line 332. Such distribution line 332 should be positioned proximate the interior surface 302 of the inner insert 300—so as to not obstruct the cavity 307.

The distribution line 332 perpendicularly connects with a plurality of feed lines 333. Each feed line 333 connects to an inflatable bladder 310 via an injector 335. Positioned within each feed line 333 is a check valve 334. The check valve 334 helps ensure that while fluid 338 can enter into the injector 335 to feed the inflatable bladder 310, that such fluid 337 cannot escape (apart from the release valves 334).

Should there be a need to deflate the inflatable bladders 310 (e.g., to remove and/or reposition the tubular assembly 100), the fluid supply assembly 330 includes a plurality of release valves 336. Each release valve 336 attaches to a separate inflatable bladder 310, in order to remove fluid 338 when needed. Upon evacuation, the fluid 338 flows from the release valve 336 into an evacuation line 337. Such fluid 338 can then be deposited within tanks, receptacles, or a R.O.V. (Remote Operating Vehicle) proximate the tubular assembly 100 positioned near the leaking pipe or fed from the ocean surface via barge or freighter.

The Annular Sleeve and Funnel Guide

Both FIG. 1 and FIG. 3 illustrate, by way of example, the components of the annular sleeve 400. First turning to FIG. 1, the annular sleeve 400 includes a front portion 401 and a corresponding rear portion 402. In addition, the annular sleeve 400 includes an external surface 403 and an interior surface 404. The interior surface 404 of the annular sleeve 400 should have a diameter and size greater than the inner insert 300. As such, the annular sleeve 400 should be tubular in dimension.

Construction of the annular sleeve 400 should ensure proper function in the extreme conditions over 1,000 feet below the sea level—including high pressures, low temperatures and interaction with toxic and highly corrosive chemicals present at the ocean floor proximate an oil and/or gas leak. Accordingly, the majority of the annular sleeve 400 should be manufactured primarily from a strong alloy metal and/or composite.

Positioned proximate the front portion 401 of the annular sleeve 400 is a funnel guide 420. The funnel guide 410 is triangular in cross section and helps orient and position the tubular assembly 100 about the leaking pipe. Moreover, the funnel guide 410 directs the leaking pipe between the inner insert 300 and the interior surface 404 of the annular sleeve 400. The funnel guide 410 can be of various lengths and orientations dependent upon the conditions and the nature of the leaking pipe.

Now turning to FIG. 3, the external surface 403 of the annular sleeve 400 preferably includes a plurality of retaining bolts 410. Upon fitting the annular sleeve 400 over the leaking pipe, such that the inner insert 300 properly positioned within that leaking pipe, the retaining bolts 410 can be secured. The retaining bolts 410 create a sufficient number of friction points along the shaft of the leaking pipe to affix the tubular assembly 100—in order to inflate the various inflatable bladders 310. The retaining bolts 410 can either be spring loaded, in order to automatically twist into place, or manually twisted through use of robotics.

FIG. 3 further illustrates positioning a plurality of pressure relief valves 440. As show, these pressure relief valves 440 are positioned at the distal end of the annular sleeve 400 (as well as near the second end 304 of the inner insert 300). These pressure relief valves 440 can be opened to allow escaping oil and/or natural gas from the leaking pipe to exit, while the annular sleeve 400 is being affixed to that leaking pipe (i.e., while the retaining bolts 410 are being secured). Put another way, the pressure relief valves 440 help prevent the build-up of pressurized oil and/or gas within the inner insert 300 while the tubular assembly 100 (further shown in FIG. 1) is being positioned and attached (which would risk the device popping off during use). FIG. 4 through FIG. 7 illustrate the positioning and location of these pressure relief valves 440 as well as the positioning of the various retaining bolts 410.

As further shown in FIG. 3, the retarder tube 210 exits from the distal end of both the inner insert 300 and the annular sleeve 400. It is preferable that a tubular gasket 220 be positioned at the exit point of the retarder tube 210 to prevent any leaking of oil and/or gas.

Method of Use

The invention is further directed to a method of reducing an oil and/or gas leak through use of a tubular assembly 100. As illustrated in FIG. 1 through FIG. 3, the method first begins through the step of inserting the front guide 200 of the tubular assembly 100 into the leaking pipe (P). The second step includes positioning the funnel guide 420 proximate to the exterior of the leaking pipe. The third step is directing the annular sleeve 400 about the leaking pipe through contact with the funnel guide 420. The third step is to allow venting gas and/or oil to escape through the cavity 307 positioned within the inner insert 300.

Upon positioning the entire annular sleeve 400 over the girth of the leaking pipe, the method next contemplates twisting the retaining bolts 410 in place (through either robotic/remote means or spring loaded bolts). Upon securing the retaining bolts 410 onto the leaking pipe, the supply fluid supply assembly 330 disburses fluid 338 into the supply line 331, which in turn directs the fluid 338 into the distribution tube 332 for placement into the various feed lines 333. The various injectors 335 then place the fluid 448 into the various inflatable bladders 310 which expand. Various check valves 334 positioned within each feed line 333 ensure that the fluid 333 remains within the inflatable bladders 310 to prevent deflation after long periods of use.

The method next contemplates each inflatable bladder 310 expanding to create an effective and non-permeable seal with the interior of the leaking pipe. The various perpendicular flanges 320 assist in maintaining this seal. Upon securing the inner insert via the inflatable bladders, vented oil and/or gas is collected by the retarder tube 210 for collection and use.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A tubular assembly sufficient to engage a leaking pipe under water, the tubular assembly comprising:
    an insert that is hallow and tubular in shape and construction having a first end, a second end, and an exterior surface;
    a plurality of inflatable bladders carried within the insert;
    a front guide attached to the first end of the insert, the front guide having a retarder tube sufficient to collect and retrieve a fluid from the leaking pipe; and
    an outer annular sleeve of sufficient size and dimension to surround both the insert and the leaking pipe, the outer annular sleeve containing a plurality of retaining bolts capable of engaging the leaking pipe.

2. The tubular assembly of claim 1, wherein the first end of the insert includes a funnel guide for engaging the leaking pipe.

3. The tubular assembly of claim 1, wherein the front guide is generally triangular in cross section.

4. The tubular assembly of claim 1, wherein the insert further includes a plurality of flanges inter-dispersed between the plurality of inflatable bladders.

5. The tubular assembly of claim 1, wherein each of the plurality of inflatable bladders is constructed of a water-proof, durable and corrosion-proof material.

6. The tubular assembly of claim 5, wherein each of the plurality of inflatable bladders comprises a synthetic rubber material.

7. The tubular assembly of claim 1, further comprising a fluid supply assembly operable with and capable of filling and evacuating each of the plurality of inflatable bladders.

8. The tubular assembly of claim 7, wherein the fluid assembly includes:
    a supply line;
    a distribution tube that is fed by the supply line,
    a plurality of feed lines attached to the distribution tube, wherein each feed line communicates with each inflatable bladder via an injector; and
    a check valve placed between each of the plurality of inflatable bladders and each feed line.

9. The tubular assembly of claim 1, wherein the annular sleeve is made of a strong alloy metal.

10. The tubular assembly of claim 1, wherein the outer annular sleeve further includes a plurality of pressure relief valves.

11. A tubular assembly sufficient to engage a leaking pipe under water, the tubular assembly comprising:
    a tubular insert having a first end, a second end, and an exterior surface;
    a plurality of inflatable bladders carried by the exterior surface of the tubular insert;
    a front guide attached to the first end of the insert, the front guide having a retarder tube sufficient to collect and retrieve a fluid from the leaking pipe;
    an outer annular sleeve of sufficient size and dimension to surround both the insert and the leaking pipe, the outer annular sleeve containing a plurality of retaining bolts capable of engaging the leaking pipe; and
    a fluid supply assembly capable of filling and evacuating each inflatable bladder, the fluid supply assembly having a supply line, a distribution tube that is fed by the supply line, a plurality of feed lines attached to the distribution tube, wherein each feed line communicates with said each inflatable bladder via an injector, and check valves placed between said each inflatable bladder and each feed line.

12. The tubular assembly of claim 11, wherein the insert further includes a plurality of perpendicular flanges inter-dispersed between said each inflatable bladder.

13. A method of reducing a fluid leak under water through use of a tubular assembly, the method comprising the steps of:
    (a) inserting a front guide into a leaking pipe, the front guide being affixed to a first end of an insert that is hallow and tubular in shape and construction and having an exterior surface that contains a plurality of inflatable bladders;
    (b) affixing a funnel guide to the first end of the insert proximate an exterior of the leaking pipe;
    (c) venting any fluid contained within the leaking pipe through an internal cavity of the hallow insert;
    (d) twisting one or more retaining bolts located on an outer annular sleeve positioned about both the leaking pipe and the exterior surface of the insert; and
    (e) inflating at least some of the plurality of inflatable bladders through use of a fluid supply assembly.

14. The method of claim 13, wherein the front guide is triangular in cross section.

15. The method of claim 13, wherein the insert further includes a plurality of perpendicular flanges which are inter-dispersed between each inflatable bladder.

16. The method of claim 13, wherein each inflatable bladder is constructed of a water-proof, durable and corrosion-proof material.

17. The tubular assembly of claim 16, wherein said each inflatable bladder is made of synthetic rubber.

18. The tubular assembly of claim 13, wherein the fluid assembly includes:
    a supply line;
    a distribution tube that is fed by the supply line,
    a plurality of feed lines attached to the distribution tube, wherein each feed line communicates with each inflatable bladder via an injector; and
    check valves placed between said each inflatable bladder and each feed line.

19. The tubular assembly of claim 13, wherein the annular sleeve is made of a strong alloy metal.

20. The tubular assembly of claim 13, wherein the annular sleeve further includes a plurality of pressure relief valves.

* * * * *